3,824,296
PROCESS FOR THE MANUFACTURE OF 1,1,2,2-TETRAHYDRO-PERFLUORO-ALKANOLS
Erich Schuierer and Klaus Ulm, Burghausen, Siegfried Rebsdat, Altötting, and Ignaz Wimmer, Unterau (Neuötting Post Office), Germany, assignors to Farbwerke Hoechst AG, Frankfurt am Main, Germany
No Drawing. Filed June 7, 1971, Ser. No. 150,770
Claims priority, application Germany, June 10, 1970, P 20 28 459.7
Int. Cl. C07c 31/34
U.S. Cl. 260—633                 10 Claims

ABSTRACT OF THE DISCLOSURE

2-Perfluoroalkyl ethanols are obtained by reacting 2-perfluoro-alkyl ethyliodides with at least the two-fold molar amount of nitric acid of about 70 to 98% strength and hydrogenating the intermediates, which are the nitrates of the desired ethanols. The products are useful as starting materials for the production of hydrophobic and oleophobic textile finishing agents, e.g. the polymer acrylates and methacrylates of said 2-perfluoroalkyl-ethanols.

---

The object of the invention is a process for the manufacture of fluorine-containing alcohols of the general formula $$R_f.CH_2.CH_2.OH,$$

in which $R_f$ represents a preferably straight chain perfluoro-alkyl radical having 4 to 16, in particular 4 to 10, carbon atoms, from fluorine-containing alkyl-iodides of the general formula $$R_f.CH_2.CH_2I,$$

in which $R_f$ has the same meaning as given above, which comprises transforming in a first step the fluorine-containing iodides with nitric acid having a strength of about 70–98%, in a molar ratio of at least 1:2, preferably about 1:3 up to 1:8, especially 1:4, at temperatures in the range of about 20–100° C., into the corresponding nitrates of the general formula $$R_f.CH_2.CH_2.O.NO_2$$

and hydrogenating them in a second step in the presence of the usual hydrogenating catalysts at temperatures of about 50–100° C. and pressures of about 0–100 atmospheres gauge to obtain the desired alcohols.

Fluorine-containing alcohols of the above indicated constitution have been obtained hitherto according to the process described in German Pat. 1,214,660 by reaction of the corresponding iodides of the general formula $R_f.CH_2.CH_2I$ with oleum and following hydrolysis of the fluorine-alkyl-sulfate esters of the general formula $R_f.CH_2.CH_2.O.SO_3H$. This process has the disadvantage that a considerable amount of the fluoro-alkyl-iodides used always passes into difficultly hydrolizable di-esters of sulfuric acid of the general formula $(R_f.CH_2.CH_2.O)_2.SO_2$ and that, in addition, the monofluoro-alkyl-sulfate esters of the general formula $R_f.CH_2.CH_2.O.SO_3H$ in the case of $R_f \geqslant C_{10}F_{21}$ are saponified essentially slower in aqueous sulfuric acid at 100° C. than the corresponding compound having shorter fluoro-alkyl radicals.

According to the process described in U.S. Pat. 3,246,030, fluoro-alkyl-iodides are reacted with silver- and mercury salts of nitric acid and the resulting nitrates are then converted by means of lithium-aluminium hydride or ammonium hydrogeno-sulfide into the corresponding fluorine-containing alcohols. However, for the manufacture on an industrial scale this process cannot be used owing to it high expenditure of silver or mercury nitrate and due to the necessity of recovering the silver and mercury from the metal halides formed during reaction.

The process of the invention is carried out in two stages which it is suitable to effect separately. In the first stage the corresponding iodide ($R_f.CH_2.CH_2.I$) is reacted with nitric acid under formation of the corresponding nitrate ($R_f.CH_2.CH_2.O.NO_2$) and iodine (iodate or iodine pentoxide, respectively, in the case of an excess of nitric acid):

$$2R_f.CH_2.CH_2.I + 4HNO_3 \rightarrow$$
$$2R_f.CH_2.CH_2.O.NO_2 + I_2 + 2NO_2 + 2H_2O$$

In the second stage the ester ($R_f.CH_2.CH_2.O.NO_2$) is reduced to the corresponding alcohol ($R_f.CH_2.CH_2.OH$) by means of hydrogen under pressure in the presence of the usual hydrogenation catalysts such as platinum, palladium, cobalt or nickel contacts on the usual carriers such as silica gel, charcoal, barium-sulfate, pummice stone or calcium carbonate, in particular, however, Raney nickel, to yield the corresponding alcohol ($R_f.CH_2.CH_2.OH$) and ammonia.

Saponification with the aid of aqueous lyes is practically not realizable, because, in addition of a number of not identifiable products, the olefin ($R_f.CH = CH_2$) corresponding to each iodide is formed.

The starting materials for the process of the invention are fluoro-alkyl-iodides having a fluoro-alkyl radical of 4–16, especially 4–10 carbon atoms. It is of advantage to use mixtures of such iodides which are obtainable, for example by telomerization of lower perfluoro-olefins to perfluoro-alkyl-iodides and addition of ethylene in known manner. For the reaction in the first stage, nitric acid is used in a concentration of about 70–98%, preferably about 85–98%, and the operation is carried out at temperatures of about 20–100° C., preferably 60–90° C. In the case of compounds containing a perfluoro-alkyl radical in the range of $C_4F_9$ or $C_6F_{13}$, temperatures in the range of between 60–80° C. should be maintained in view of the high volatility of the substances. The reaction sets in already at room temperature; for completing the reaction, however, it is recommended to raise the temperature at the end of the reaction to at least 60–65° C.

The molar proportion of fluorine-containing alkyl-iodide to nitric acid may amount to about 1:2 to 1:8 and more, preferably 1:3 to 1:8, and should suitably and preferably be 1:4.

The reaction may be carried out by two ways, either by introducing first the nitric acid and then adding, portionwise, the fluorine-containing alkyl-iodide or by first introducing the iodide in molten state and then continuously adding dropwise the nitric acid.

A preferred embodiment of the process of the invention is described hereinafter.

The total amount of fluoro-alkyl-iodide is introduced in molten state and the nitric acid is added dropwise, while stirring. The reaction starts rapidly. The nitrate formed as the reaction product is soluble in the mixture of the reaction partners. Iodine in elementary form is formed as a secondary product. The major part of its sublimates at the chosen reaction temperature and can be easily recovered after separation in a suitable cooling apparatus. After removal of the major part of iodine, water is added to the reaction mixture and the nitrate is separated from the aqueous phase. It is then dissolved in inert, low molecular weight, halogen-containing hydrocarbons, preferably in chloroform or methylene chloride. Residual fluorine-containing nitrates can also be recovered from the aqueous phase by means of chloroform or methylene chloride. The organic phase is still contaminated by low amounts of iodine and nitric acid. It is washed with water until it is free from acid and the iodine still contained therein as impurity is removed by pumping at about normal pressure or under reduced pressure. The fluorine-containing nitrates are obtained in the form of weakly pink coloured oils or solids (see Table I). They are not decomposed by water or excess of nitric acid; with compounds having a $R_f$ radical of $C_4F_9$ up to $C_8F_{17}$ they can be easily purified by distillation.

If the reaction is carried out by introducing at first the nitric acid and then adding dropwise the fluorine-containing iodide, the iodide separated during the hydrolysis passes immediately into an iodate or iodine-pentoxide due to oxidation by the excess of nitric acid. The fluorine-containing nitrate is precipitated also in this case by the addition of water. The aqueous phase then contains the iodine in the form of iodic acid. Recovery of the iodine can be effected, if desired, in known manner by introduction of $SO_2$.

When carrying out the second process step, i.e. the hydrogenation of the fluorine-containing nitrate, care should be taken that the latter is previously washed as far as possible to become free of nitric acid; purification by distillation is not absolutely necessary.

The hydrogenation is carried out with a view to practical application in a pressure range of about 20 to 100 atmospheres gauge, preferably 30 to 50 atmospheres gauge. As catalyst Raney nickel is preferably used in a quantity of about 5–10% by weight, preferably 6–8% by weight, referred to the fluorine-containing nitrate used. As reaction mediums, lower alkanols, especially methanol, are suitable. The reaction is effected advantageously in an autoclave made of stainless steel or an autoclave lined with silver. The reaction temperature is in the range of 50–100° C., preferably at 70–90° C. After termination of the hydrogen consumption pressure in the autoclave is then released and the reaction mixture obtained is freed from catalyst by filtration. The solvent is then removed by distillation and the fluorine-containing alkanols obtained are then purified by distillation under reduced pressure. In principle, the hydrogenation with Raney nickel in methanol is also possible without excess pressure at about 60° C.; however, the time needed therefor is three to four times longer for about 30–40 g. of fluorine-containing nitrate.

The proof of the structure of the fluorine-containing nitrate prepared can be made by comparative tests and with the use of the infrared absorption spectrums. If, for example, $C_6F_{13}CH_2.CH_2.OH$ (prepared according to German Pat. 1,214,660) is esterified according to known methods on the one hand with 98% nitric acid (cf. Example 6) and on the other hand with nitrous acid (from $NaNO_2$ and $H_2SO_4$, cf. Example 7), two different liquid products are obtained:

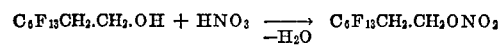

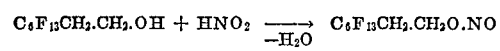

of which the first with regard to its characteristical data (cf. Table I) and its infrared spectrum is identical with the reaction product obtained from $C_6F_{13}CH_2.CH_2.I$ and $HNO_3$.

The fluorine-containing nitrates prepared according to the present invention are characterized by the following data:

By the reaction with unsaturated organic acids, especially acrylic acid, acrylic acid and their ester-forming derivatives, valuable esters are obtained which after polymerization yield oil- and water-repelling agents for textile materials.

The following Examples illustrate the invention:

EXAMPLE 1

(a) 110 g. (1.71 moles) of 98% nitric acid were added dropwise at 65° C., while stirring, within 2.5 hours, to 160 g. (0.428 mole) of n-$C_4F_9CH_2CH_2I$. After completion of the dropwise addition, the whole was further stirred for 8 hours at 70° C. The iodine set free during the reaction sublimated from the reaction mixture, deposited in a water-cooled finger within the gas space of the flask and was removed repeatedly and mechanically from this finger. The reaction mixture was allowed to cool and then combined with 100 ml. of water. The organic phase which was separating was taken up in 100 ml. of chloroform; the aqueous phase was extracted several times with a small amount of chloroform and the chloroform phases were combined. In order to remove any present acid, the chloroform solutions were washed several times with small amounts of water. The organic phase was then subjected to distillation. At first chloroform and iodine which had been dragged in were removed by distillation up to a sump temperature of 120° C. The remaining residue was passed over under reduced pressure. 119 g. of reddish n-$C_4F_9C_2H_4ONO_2$ were obtained at 50–60° C./12 mm. Hg were obtained. This corresponded to a yield of 90% (analysis: N calculated 4.5% for $C_6H_4F_9NO_3$, and found 4.3%).

(b) 62.4 g. (0.202 mole) of n-$C_4F_9C_2H_4ONO_2$ together with 100 g. of methanol and 6 g. of Raney nickel were introduced in an autoclave of stainless steel. After having rinsed several times with $N_2$ and $H_2$, $H_2$ was introduced at a pressure of 30 atmospheres gauge and the pressure vessel was then heated to 80° C. When this temperature was reached, hydrogenation was effected at a $H_2$ pressure of 50 atmospheres gauge (duration 2–4 hours). After cooling and release of the pressure any residues of the catalyst were removed from the reaction mixture by filtration and then the methanol was eliminated by distillation. A brownish liquid remained behind from which 48.5 g. ≙ 91% of the theory of n-$C_4F_9C_2H_4OH$ were recovered by distillation at 73–76° C./50 Torr. (Analysis: OH number calculated for $C_6H_5F_9O$=212; OH number found 211).

EXAMPLE 2

(a) 145 ml. (3.38 moles) of 98% of nitric acid were added dropwise at 80° C., while stirring, in the course of 3 hours to 400 g. (0.845 mole) of n-$C_6F_{13}C_2H_4I$. The mixture was then further stirred for 8 hours at 85° C. The elimination of the iodine was carried out as described in Example I. The fluorine-containing nitrate was separated from the mixture by the addition of 200 ml. of water. The further working up was likewise effected as

TABLE I

| | Boiling point | Melting point | Refractive index (25° C.) |
|---|---|---|---|
| Compound: | | | |
| $C_4F_9C_2H_4ONO_2$ | 50–60° C./12 mm. Hg | | |
| $C_6F_{13}C_2H_4ONO_2$ | 72–77° C./11 mm. Hg | ca. −20° C. | 1,327 |
| $C_8F_{17}C_2H_4ONO_2$ | 100–105° C./10 mm. Hg | 34.5° C. | |
| $C_{10}F_{21}C_2H_4ONO_2$ | | 74° C. | |
| Comparative tests: | | | |
| $C_6F_{13}C_2H_4ONO_2$ [1] | 72–77° C./11 mm. Hg | ca. −20° C. | 1,328 |
| $C_6F_{13}C_2H_4ONO$ [2] | 49–58° C./11 mm. Hg | < −20° C. | 1,314 |

[1] Prepared according to example 6 from $C_6F_{13}C_2H_4OH$ and $HNO_3$.
[2] Prepared according to example 7 from $C_6F_{13}C_2H_4OH$ and $HNO_2$.

The fluorine-containing alcohols prepared in this manner are valuable starting materials in the manufacture of oleophobic and hydrophobic agents and of surfactants.

described in Example I. The liquid reddish crude product obtained after evaporation of the solvent could be purified by distillation under reduced pressure. 314 g. ≙ 91% of the theory of pure n-$C_6F_{13}C_2H_4ONO_2$ were obtained at 72–77° C./11 mm. Hg.

Analysis:
N calculated for $C_8H_4F_{13}NO_3$=3.42;
N found 3.40%

(b) 280 g. (0.685 mole) of n-$C_6F_{13}C_2H_4ONO_2$ together with 520 g. of methanol and 20 g. of Raney nickel were introduced into an autoclave having a capacity of 2.5 liters. After having rinsed several times with $N_2$ and hydrogen, hydrogen was introduced with a pressure of 30 atmospheres gauge and the autoclave was heated within 2 hours to 90° C. When this temperature was reached the pressure of hydrogen was increased to 50 atmospheres gauge. The autoclave was then shaken at 90° C. for 6 hours, the pressure of hydrogen being maintained constant. The hydrogen consumed was replenished from a pressure bomb. The pressure vessel was then cooled and emptied. Any residues of catalyst were removed from the mixture by filtration over folding filters. After removal of the methanol used as the solvent, the desired product was obtained at first in the form of a fluorine-containing, crude alcohol. This alcohol could be purified by distillation under reduced pressure (boiling point 93° C./35 mm.). The yield was 239 g., corresponding to 96% of the theory, referred to the nitrate used initially. According to gas chromatographical tests, the fluorine-containing alcohol was found to be identical with the product described in German Pat. 1,214,660, Example 1, (purity 99.4%).

EXAMPLE 3

(a) 120 ml. of 98% nitric acid (2.80 moles) were added dropwise, at 85° C., while stirring, within 3 hours, to 400 g. (0.697 mole) of n-$C_8F_{17}C_2H_4I$, and the mixture was then stirred for 8 hours at 90° C. Working up of the reaction mixture was effected as described in Examples 1 and 2. After evaporation of the solvent a reddish, solid, crude product remained behind which could be purified by distillation under reduced pressure at 100–105° C./10 mm. Yield 340 g. ≅93% of the theory (iodine content <0.1%).

Analysis:
N calculated for $C_{10}H_4F_{17}NO_3$=2.7;
N found 2.5%

(b) 318 g. (0.625 mole) of n-$C_8F_{17}C_2H_4ONO_2$ together with 830 g. of methanol and 21 g. of Raney nickel were filled into an autoclave having a capacity of 2.5 liters and being lined with silver. After several rinsings with $N_2$ and $H_2$ at first $H_2$ with a pressure of 30 atmospheres gauge was introduced and the whole was heated within 2 hours to 90° C. When this temperature was reached the pressure of hydrogen was increased to 50 atmospheres gauge and the autoclave was shaken for 6 hours at constant hydrogen pressure. Working up of the hydrogenation mixture was then carried out as described under Example 2. 273 g. ≅94% of the theory of n-$C_8F_{17}C_2H_4OH$ (boiling point 95–96° C./11 mm.) were obtained. According to gas chromatographical tests, the product was found to be identical with the product obtained according to German Pat. 1,214,660, Example 2, n-$C_8F_{17}C_2H_4OH$ (purity 99.9%).

Analysis:
OH number calculated for $C_{10}H_5F_{17}O$=121;
OH number found 120

EXAMPLE 4

(a) 400 g. of n-$C_{10}F_{21}C_2H_4I$ (0.594 mole) were combined at 85° C., while stirring, within 3 hours with 102 ml. of 98% nitric acid (2.38 moles). The whole was then stirred for 8 hours at 85° C. Working up of the reaction product was effected as described in Examples 2 and 3. After removal of the solution, 322 g. ≅89.2% of the theory of crude n-$C_{10}F_{21}C_2H_4ONO_2$, remained behind.

(b) 322 g. of the crude n-$C_{10}F_{21}C_2H_4ONO_2$ (washed with water until free from acid) so prepared together with 950 g. of methanol and 18 g. of Raney nickel were introduced into an autoclave having a capacity of 2.5 liters. After rinsing with $N_2$ and $H_2$, hydrogen having a pressure of 30 atmospheres gauge was introduced and the pressure vessel was heated to 90° C. The hydrogen pressure was then increased to 50 atmospheres gauge. After 4 hours the hydrogenation was completed and the reaction mixture was worked up as described in Examples 2 and 3. 284 g. ≅95% of the theory of n-$C_{10}F_{21}C_2H_4OH$ (boiling point 108–117° C./11–12 mm. Hg) were obtained.

Analysis:
OH number, calculated for $C_{12}H_5F_{21}O$=99.5;
OH number found=100

EXAMPLE 5

Example 3a was repeated in varying the concentration of the nitric acid used within the range of 65–98% and the reaction temperatures from 70–90° C. The results are compiled in the following Table 2

| Concentration of $HNO_3$ in percent | Reaction temperature (° C.) | Yield of n-$C_8F_{17}C_2H_4ONO_2$ referred to n-$C_8F_{17}C_2H_4I$ (percent of the theory) |
|---|---|---|
| 65 | 90 | (1) |
| 75 | 90 | (2)50 |
| 85 | 90 | 91 |
| 98 | 90 | 93 |
| 98 | 70 | 90 |
| 98 | 80 | 89–90 |

[1] No reaction.
[2] About.

EXAMPLE 6

Comparative test (preparation of n-$C_6F_{13}C_2H_4ONO_2$ from n-$C_6F_{13}C_2H_4OH$):

3.0 ml. of 98% $HNO_3$ were added dropwise, while stirring, at 60° C., within 5 minutes to 11.5 g. (0.0316 mole) of n-$C_6F_{13}C_2H_4OH$, and the mixture was then stirred for 20 minutes at 60° C. The ester was then separated by means of water, washed several times with water and distilled (boiling point 72–77° C./11 mm.).

EXAMPLE 7

Comparative test (preparation of n-$C_6F_{13}C_2H_4ONO$):
10.0 g. (0.0275 mole) of n-$C_6F_{13}C_2H_4OH$ were combined, while stirring, at 4–5° C. at first with 2.3 g. of $NaNO_2$ and then dropwise with 3.2 g. of 50% $H_2SO_4$. The whole was then stirred for 5 hours at 4–5° C. The nitrous acid ester was then separated with the aid of 30 ml. of distilled $H_2O$, washed and distilled (boiling point 49–58° C./11 mm.).

EXAMPLE 8

A mixture of 27.5 g. (0.054 mole) of
n-$C_8F_{17}(CH_2)_2ONO_2$,
75 g. of pure methanol and 2 g. of Raney nickel was reacted at 60° C. at a pressure of 1 atmosphere for 14 hours with gaseous hydrogen. The yield of n-$C_8F_{17}C_2H_4OH$ was 19.0 g. ≅ 76% of the theory.

EXAMPLE 9

Example 3b was repeated in varying the temperature during hydrogenation within the range of from 60–90° C. (cf. Table 3). The reaction time was 6 hours.

Table 3

| Reaction temperature, ° C. | Yield in percent of n-$C_8F_{17}C_2H_4OH$ referred to n-$C_8F_{17}C_2H_4ONO_2$ used |
|---|---|
| 60 | 84 |
| 70 | 85 |
| 80 | 91 |
| 90 | 94 |

EXAMPLE 10

Example 3a was repeated using a molar proportion of n-$C_8F_{17}C_2H_4I$ to 98% $NHO_3$ of 1:3. In contradistinction to Example 3a, the reaction mixture contains non-reacted n-$C_8F_{17}C_2H_4I$, at the rate of 7%.

EXAMPLE 11

100 g. (0.174 mole) of n-$C_8F_{17}C_2H_4I$ were added slowly, while stirring, within 35 minutes to 200 ml. (4.77 moles) of 98% $HNO_3$, at 70° C. The whole was then stirred for ½ hour at 70° C. After cooling, the fluorine-containing nitrate formed was separated by means of 200 ml. of $H_2O$ and taken up in $CH_2Cl_2$. The organic solution was washed until it was free from acid, dried and the solvent was removed by distillation. The fluorine-containing crude ester remaining behind was purified by distillation. The yield was 70 g. ≙ 86% of the theory of n-$C_8F_{17}C_2H_4ONO_2$.

We claim:

1. In a process for the preparation of an alcohol of the formula $$R_f-CH_2-CH_2-OH$$

in which $R_f$ is perfluoroalkyl of 4 to 16 carbon atoms, from an iodide of the formula $$R_f-CH_2-CH_2-I$$

in which $R_f$ is as defined above, by interaction of a mineral acid, the improvement comprising reacting said iodide in a first step with at least the three-fold molar amount of nitric acid of about 85 to about 98% strength at a temperature of about 60 to about 100° C. to yield an ester of the formula $$R_f-CH_2-CH_2-ONO_2$$

in which $R_f$ is as defined as above, washing said ester until free of acid and hydrogenating in a second step said esters in the presence of Raney nickel as catalyst at a temperature of about 50 to about 100° C. and at a pressure of about 0 to about 100 atm. g.

2. The process as claimed in claim 1, in which iodides are reacted, the $R_f$ moiety of which is n-perfluoroalkyl of 4 to 16 carbon atoms.

3. The process as claimed in claim 1, in which iodides are reacted, the $R_f$ moiety of which is perfluoroalkyl of 4 to 10 carbon atoms.

4. The process as claimed in claim 1, in which the reaction temperature of the first step is about 60 to about 90° C.

5. The process as claimed in claim 1, in which the molar ratio of iodide to nitric acid is in the range of about 1:3 to about 1:8.

6. The process as claimed in claim 1, in which the molar ratio of iodide to nitric acid is in the range of about 1:4.

7. The process as claimed in claim 1, in which the nitric acid is dropped to the liquid or molten iodide.

8. The process as claimed in claim 1, in which the iodide is added portionwise to the reaction vessel precharged with nitric acid.

9. The process as claimed in claim 1, in which the hydrogenation temperature is in the range of about 60 to about 90° C.

10. The process as claimed in claim 1, in which the hydrogenation is performed at a pressure of about 30 to about 50 atm. g.

References Cited

UNITED STATES PATENTS

| | | | |
|---|---|---|---|
| 3,246,030 | 4/1966 | Seil et al. | 260—633 |
| 3,283,012 | 11/1966 | Day | 260—633 |

FOREIGN PATENTS

| | | | |
|---|---|---|---|
| 202,098 | 9/1967 | U.S.S.R. | 260—467 |

HOWARD T. MARS, Primary Examiner

OTHER REFERENCES

Khun, J. Chem. Soc., 68, pp. 1761–1762, 1946.

U.S. Cl. X.R.

260—467